United States Patent [19]

Tsuji et al.

[11] 4,418,423
[45] Nov. 29, 1983

[54] DISPARITY DETECTION APPARATUS

[75] Inventors: Yoshitake Tsuji; Nobuhiko Mori; Kazunari Egami, all of Tokyo, Japan

[73] Assignee: Nippon Electric Co. Ltd., Tokyo, Japan

[21] Appl. No.: 300,569

[22] Filed: Sep. 9, 1981

[30] Foreign Application Priority Data

Sep. 11, 1980 [JP] Japan ............................... 55-126244

[51] Int. Cl.³ .............................................. G06K 9/00
[52] U.S. Cl. ......................................... 382/40; 382/57
[58] Field of Search ....................... 382/39, 40, 57, 36; 340/146.2; 179/1 SA, 1 SB, 1 SD

[56] References Cited

U.S. PATENT DOCUMENTS

| | | | |
|---|---|---|---|
| 3,188,609 | 6/1965 | Harmon et al. | 382/40 |
| 3,839,702 | 10/1974 | Chaires et al. | 382/40 |
| 3,969,698 | 7/1976 | Bollinger et al. | 382/40 |
| 3,988,715 | 10/1976 | Mullan et al. | 382/40 |
| 4,003,025 | 1/1977 | Hilliard et al. | 382/40 |
| 4,058,795 | 11/1977 | Balm | 382/40 |
| 4,355,302 | 10/1982 | Aldefeld et al. | 382/40 |

Primary Examiner—Leo H. Boudreau
Attorney, Agent, or Firm—Laff, Whitesel, Conte & Saret

[57] ABSTRACT

Responsive to each character field, a word recognition apparatus separates a first train of characters $\alpha_1, \alpha_2, \ldots \alpha_n$, which are regarded as characters of a first kind, and a second train of characters $\beta_1, \beta_2, \ldots \beta_n$, which are regarded as characters of second kind. First and second registers store the first and second train of characters, respectively. A first storage device stores a first kind of intercharacter distance of the first kind of characters and a second storage device stores a second kind of intercharacter distance of the second kind of characters. A third storage device stores a dictionary of words, which is compared with the output character train of the character reader. The first and second kinds of intercharacter distances in the dictionary words are compared with items in the contents of the first and second registers. The intercharacter distance comparisons result in a selection of a smaller of at least two values as a representative intercharacter distance between a character the dictionary word and first and second kind of characters. A disparity between the dictionary word and the character output trains is resolved by a use of a representative character distances which is selected by the comparing means.

1 Claim, 5 Drawing Figures

|     |   | 0 | 1 | 2 | 3 | 4 | 5 | 6 |   | 15 |   | 26 |
|-----|---|---|---|---|---|---|---|---|---|----|---|----|
|     |   | △ | A | B | C | D | E | F | – | O  | – | Z  |
| 0   | △ | 0 | 15| 15| 15| 15| 15| 15| – | 15 | – | 15 |
| 1   | A | 15| 0 | 15| 15| 15| 15| 15| – | 15 | – | 15 |
| 2   | B | 15| 15| 0 | 15| 12| 8 | 15| – | 15 | – | 15 |
| 3   | C | 15| 10| 15| 0 | 15| 15| 15| – | 8  | – | 15 |
| 4   | D | 15| 15| 15| 12| 0 | 15| 15| – | 5  | – | 15 |
| 5   | E | 15| 15| 10| 15| 15| 0 | 8 | – | 15 | – | 15 |
| 6   | F | 15| 15| 15| 15| 15| 10| 0 | – | 15 | – | 15 |
| 7   | G | 15| 10| 15| 10| 15| 15| 15| – | 15 | – | 15 |
|     |   | 15|   |   |   |   |   |   |   |    |   |    |
|     |   |   |   |   |   |   |   |   |   |    |   |    |
|     |   | 15|   |   |   |   |   |   |   |    |   |    |
| 15  | O | 15| 10| 15| 6 | 8 | 15| 15| – | 0  | – | 15 |
|     |   | 15|   |   |   |   |   |   |   |    |   |    |
|     |   |   |   |   |   |   |   |   |   |    |   |    |
|     |   | 15|   |   |   |   |   |   |   |    |   |    |
| 26  | Z | 15| 15| 15| 15| 15| 13| 15| – | 15 | – | 0  |
| 27  | ? | 15| 15| 15| 15| 15| 15| 15| – | 15 | – | 15 |

FIG. 1

|   | | 1 | 2 | 3 | 4 | 5 | 6 |
|---|---|---|---|---|---|---|---|
|   |   | I | R | N | E | I | N |
| 1 | I,I | 0,0 | 15,15 | | | | |
| 2 | ?,? | 15,15 | 15,15 | 15,30 | | | |
| 3 | ?,e | | 15,30 | 15,30 | 0,30 | | |
| 4 | ?,i | | | 15,45 | 15,45 | 0,30 | |
| 5 | ?,n | | | | 15,60 | 15,45 | 0,30 |

DISPARITY DETECTION APPARATUS

BACKGROUND OF THE INVENTION

The present invention generally relates to a word recognition apparatus which recognizes a train of character outputs derived from a optical character reader (OCR) by comparing the train of character outputs with a plurality of pre-stored dictionary words. More particularly, the present invention is concerned with apparatus for determining the degree of disparity between a train of OCR character as common nouns.

Different from numerical characters showing a number, alphabetic characters representing a word bear significant mutual dependency within the word and often have sufficient redundancy. Therefore, by making recognition of a series of alphabetic characters on a word-by-word basis, the dependency and redundancy of the characters can be effectively utilized to enable correction of misread characters and reading of unidentifiable characters. This will realize a marked increase in the rate of a character recognition. Such word-by-word recognition will hereinafter be referred to as "word recognition" for convenience.

When an OCR is employed for recognition of alphabetic characters including upper case characters (e.g. capital letters) and lower case characters (e.g. small letters) inscribed on a mail or a document, it is conventional that the OCR produces two kinds of outputs regarding the characters on the mail or the document as upper case alphabetic characters and as lower case alphabetic characters, respectively, in order to achieve a higher accuracy in recognition. These two trains of the character outputs from the OCR may be processed by the system disclosed in U.S. Pat. No. 4,003,025 by way of example. This prior art system discriminates whether one alphabetic character field (e.g., a word) is an upper case character field or a lower case character field and then makes error correction by means of a word recognition apparatus. However, it is sometimes difficult to discriminate between a upper case character and a lower case character when a character field contains both the upper case and lower case characters or when the quality of characters on a document scanned by the OCR is poor. The resulting disparity between an OCR character output train and a dictionary word would be inaccurate, deteriorating the eventual accuracy in word recognition.

SUMMARY OF THE INVENTION

It is therefore an object of the present invention to provide a disparity detection apparatus which works with high accuracy even when a character field contains both the upper and lower case characters or characters of a poor quality.

Another object of the present invention is to provide a disparity detection apparatus which can process OCR outputs with a high word recognition accuracy even if a discriminator of alphabetic upper and lower case characters lacks a sufficient performance or even where any such discriminator is not provided in the system.

A disparity detection apparatus according to the present invention is of such a type that compares a train of characters from an OCR with a plurality of words preliminarily stored in a word dictionary and detects disparities between the OCR character output train and the respective dictionary words. The disparity detection apparatus of the invention is featured by detecting intercharacter distances between a first kind OCR character output train (e.g., upper case alphabetic character field) and a dictionary word and between a second kind OCR character output train (e.g., lower case alphabetic character field) and that dictionary word and selecting either one of the first and second character trains which has a more probable intercharacter distance than other.

In more general, the disparity detection apparatus of the invention comprises a first register for storing a train of characters $\alpha_1 \alpha_2 \ldots \alpha_n$ delivered thereto from an OCR in the order of delivery, which character train has been outputted from the OCR as characters of a first kind corresponding to one character field, a second register for storing a train of characters $\beta_1 \beta_2 \ldots \beta_n$ delivered thereto from the OCR in the order of the delivery, which character train has been outputted from the OCR as characters of a second kind also corresponding to the same one character field, a first storage device for storing a first kind intercharacter distance $d[\alpha, U(i)]$ between the ith character category $U(i)$ of the first kind of characters and a character $\alpha$ outputted from the OCR regarded as the first kind of character, a second storage device for storing a second kind intercharacter distance $d[\beta, L(i)]$ between the ith character category $L(i)$ of the second kind of characters and a character $\beta$ outputted from the OCR regarded as the second kind of character, intercharacter distance readout means for reading from the first storage device as the first kind intercharacter distance $d[\alpha, U(i)]$ the distance $d[\alpha_k, a_j]$ which is determined by the jth character $a_j$ of a word and the content $\alpha_k$ of the kth element (where $j-s \leq k \leq j+s$ and s is a preselected constant 0, 1, 2, ...) of the first register to be compared with the jth component $a_j$ of the word and from the second storage device as the second kind intercharacter distance $d[\beta, L(i)]$ the distance $d[\beta_k, a_j]$ which is determined by the jth character $a_j$ of the word and the content $\beta_k$ of the kth element of the second register to be compared with $a_j$, intercharacter distance comparison means for comparing the read-out intercharacter distances $d[\alpha_k, a_j]$ and $d[\beta_k, a_j]$ to select a smaller one as a representative intercharacter distance between the character $a_j$ of the word and kth output characters $\alpha_k$ and $\beta_k$ of the OCR, and means for calculating the disparity between the dictionary word and the OCR character output train by use of the representative intercharacter distances selected by the intercharacter distance comparison means.

BRIEF DESCRIPTION OF THE DRAWINGS

FIG. 1 is a conceptional table showing an example of a set of intercharacter distances of upper case alphabetic characters:

FIGS. 3a and 3b are views explanatory of a method of calculating disparities in accordance with the present invention.

DESCRIPTION OF THE PREFERRED EMBODIMENT

While the disparity detection apparatus of the present invention is susceptible of numerous physical embodiments, depending upon the environment and requirements of use, substantial numbers of the herein shown and described embodiment have been made, tested and used, and all have performed in an eminently satisfactory manner.

Referring now to FIG. 1 of the drawings, there is shown a conceptional table which represents an example of a set of intercharacter distances between upper case alphabetic characters. In the table, the alphabetic characters along the rows indicate a character category which constitutes words of a dictionary (called "dictionary character" herein) with "Δ" (triangle) representative of a blank; the alphabetic characters along the columns indicate OCR character outputs with "Δ" also representative of a blank and "?" representative of an unidentifiable character.

The individual elements in the table of FIG. 1 have numerical values which represent intercharacter distances between the OCR character outputs and dictionary characters. For example, the OCR character output "O" and dictionary character "D" are at a distance $d_{15,4}(O,D)$ (where the numerical indices denote the positions of the specific characters in the column and row directions, respectively) which has a value "8". Likewise, the intercharacter distance $d_{15,5}(O,E)$ between the OCR character output "O" and dictionary character "E" has a value "15". The intercharacter distance $d_{15,4}(O,D)$ is smaller than the intercharacter distance $d_{15,5}(O,E)$ in the table since the upper case alphabetic character "O" more resembles the upper case character "D" than the upper case character "E". The OCR character output "O" and the dictionary character "O" are at an intercharacter distance $d_{15,15}(O, O)$ of a value "0", which suggests that they are completely matched.

The intercharacter distances shown in the table may be calculated by the following procedure.

The intercharacter distance $d_{i,j}$ between an OCR character output and a dictionary character in FIG. 1 is calculated by logarithmic conversion of the confusion probability $P[U(j)|\alpha(i)]$ that the jth dictionary character $U(j)$ (j=0, . . . 26) is recognized as the ith OCR character output $\alpha$ (i) (i=0, . . . 27), into $-C. \log P[U(j)|\alpha(i)]$ where C is a constant preselected to express $-\log P U(j) (i)$ as a given range of numerical values (e.g. values 0 to 15 in FIG. 1). It should be noted, however, that such a method of intercharacter distance $d_{i,j}$ calculation is illustrative but not limitative in any way.

Concerning lower case alphabetic characters, their intercharacter distance table is provided in the same way as the upper case alphabetic characters.

Figure 2:
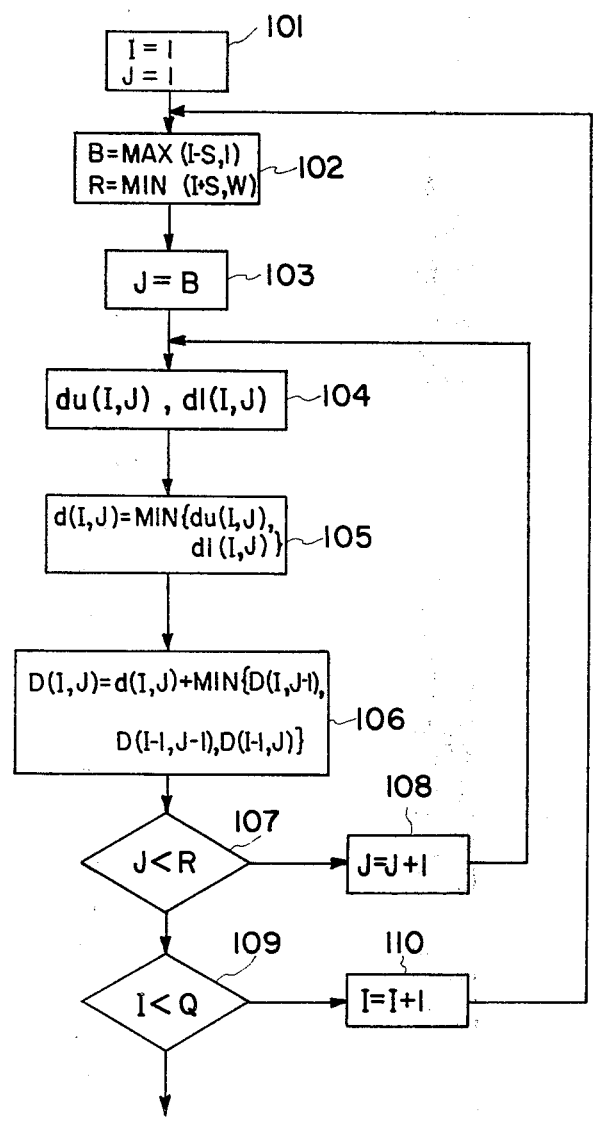
FIG. 2 is a flowchart demonstrating an operation of embodiment of the present invention.

FIG. 2 shows a flowchart which demonstrates operations of a preferred embodiment of the present invention. Denoted by S in this drawing is a predetermined width of comparison which implies herein, supposing that the Ith character of the OCR output character train is to be compared with the (I−S)th to (I+S)th characters of a dictionary word, the value of S. Q denotes the number of characters contained in an OCR character output train, which is assumed herein to refer generically to the character output train regarded as upper case characters and the character output train regarded as lower case characters. W denotes the number of characters of the dictionary word to be compared with the OCR character output. I denotes the Ith character position of an OCR character output train; the position I will be called the "comparing input position" hereinafter. J denotes the Jth character position of the dictionary word; the position J will be called the "comparing word position" in contrast to the "comparing input position". Indicated by $d_U(I,J)$ and $d_L(I,J)$ are the intercharacter distances which will result from comparison of the Ith character of an upper case OCR alphabetic character output train and that of a lower case OCR alphabetic character output train with the Jth character of a dictionary word, respectively. Further, indicated by $D(I,J)$ is the degree of disparity or, simply disparity, resulting from the comparison between the character of an OCR character output train up to the Ith and the characters of a dictionary word up to the Jth. The disparity $D(I,J)$ is calculated using the equation: $D(I,J)=d(I,J)+MIN\{D(I,J-1), D(I-1,J-1), D(I-1,J)\}$ which is enclosed in the block 106 in FIG. 2. In this equation, $d(I,J)$ represents the smaller value of the aforesaid intercharacter distances $d_U(I,J)$ and $d_L(I,J)$ while $MIN\{D(I,J-1), D(I-1,J-1), D(I-1,J)\}$ represents the minimum value of the disparities $D(I,J-1)$, $D(I-1,J-1)$, and $D(I-1,J)$. The specific disparity $D(I,J)$ computed by the equation of the block 106 when the comparing input position I has coincided with the number Q of characters in the OCR output train and the comparing word position J with the number W of characters of the word, will be referred to as the degree of disparity, or simply disparity, between the OCR character output train and the dictionary word.

Now, operations at the various steps shown in FIG. 2 will be discussed in detail.

At a step 101, the comparing input position I and comparing word position J are commonly set at "1" as initial values. At a step 102, B is loaded with the maximum value $MAX(I-S,1)$ of the difference $(I-S)$ between the comparing input position I and width of comparison S, and "1", R is loaded with the minimum value $MIN(I+S,W)$ of the sum of the comparing input position I and comparison width S and the number W of characters of a dictionary word. Thus, characters of a word to be compared with the Ith character of an OCR character output train will be those positioned between $B\{=MAX(I-S,1)\}$ and $R\{=MIN(I+S,W)\}$.

At a step 103, the comparing word position J is loaded with the value of B, i.e., $MAX(I-S,1)$. It is at a step 104 that the intercharacter distances $d_U(I,J)$ and $d_L(I,J)$ are calculated as already mentioned. As also described previously, at a step 105, the minimum value of the distance $d_U(I,J)$ between the upper case OCR character output and the dictionary character and the distance $d_L(I,J)$ between the lower case OCR character output and the dictionary character is selected to provide an intercharacter distance $d(I,J)$.

At a step 106, a degree of disparity $D(I,J)$ is attained as has already been discussed. Then, at a step 107, it is determined whether J<R where J is the comparing word position and R the determined value MIN-(I+S,W). If the result is "YES", the value of the comparing word position J is incremented by "1" at a step 108 and the operation goes back to the step 104. If "NO", meaning J=R, the operation advances to a step 109. For example, supposing that the width of comparison S is "2", then $B=MAX(I-2,1)$ and $R=MIN-(I+2,W)$ so that an OCR character output at the comparing input position will be compared not only with the Ith character of a dictionary word but with two characters immediately before and after the Ith character. If the width of comparison S is "0", then $B=I$ and $R=MIN(I,W)$ which suggest that an OCR character output at the Ith comparing input position will be compared with the Ith dictionary character only.

The width of comparison S is predetermined in advance. Its value S will be S=1, 2, . . . , if the number of characters in an OCR character output train tends to be varied by a segmentation error. If otherwise, the width of comparison S may be "0".

At the step 109, whether $I<Q$ is determined where I is the comparing input position and Q the number of characters of the word. If the result is "YES", the comparing input position I is incremented by "1" at a step 110 and the operation returns to the step 102. If "NO", meaning $I=Q$, the disparity $D(I,J)$ (where $I=Q$, $J=W$) is detected as the disparity between the OCR character output train and the dictionary word.

In this way, a given OCR character output train is compared with a plurality of dictionary words having number of characters the same as and around that of the OCR character output train, and disparities between the given OCR character output train and the respective dictionary words are computed and then transferred to a discrimination circuit. The discrimination circuit may be so designed, for example, as to process the smallest disparity $D_1$ and the second smallest disparity $D_2$ of all the input disparities and, if $D_1 \leq T_1$ and $D_2 - D_1 > T_2$ where $T_1$ and $T_2$ are predetermined thershold values, produce the word of the smallest disparity as a recognized word.

A practical example of the method of computing disparities according to the invention is shown in FIG. 3; in connection with the flowchart of FIG. 2, the width of comparison S is supposed to be "1". Let is be assumed that an OCR has scanned a series of alphabetic characters "Irnein" inscribed on a document but outputted a train of upper case alphabetic characters "I????" and a train of lower case alphabetic characters "1?ein" as indicated in the leftmost column of FIG. 3a. Specifically, the first character the OCR recognized is the upper case character "I" and lower case character "1", the second is the unidentifiable character "?", the third is the lower case character "e", the fourth is the lower case character "i", and the fifth is the lower case character "n".

Meanwhile, suppose that the OCR character output train is to be compared with a dictionary word "IRNEIN" which is indicated in the uppermost row in FIG. 3a as the dictionary character train. While the dictionary word consisting solely of the upper case alphabetic characters "IRNEIN" is shown in FIG. 3a, upper case and lower case alphabetic characters in practice will not be distinguished from each other in dictionary words, that is, whether to regard individual characters of a dictionary word as upper case alphabetic characters or as lower case alphabetic characters will be determined depending solely on OCR character outputs which are either upper case or lower case. Stated another way, if OCR character outputs are upper (lower) case, dictionary characters for comparison will be regarded as upper (lower) case characters and the intercharacter distances will be calculated accordingly.

Of the two different numerical values shown in the Ith row ($I=1\ldots5$), Jth column ($J=1\ldots6$) element, the left represents the intercharacter distance $d(I,J)$ between the Ith character of the OCR character output train and the Jth character of the dictionary word, whereas the right represents the disparity $D(I,J)$ resulting from comparison between the characters of the OCR character output train up to the Ith and the dictionary characters up to the Jth. The intercharacter distances $d(I,J)$ are provided by the operation at the step 105 of FIG. 2, and the disparities $D(I,J)$ by the operation at the step 106 of the same drawing. The intercharacter distances $d(I,J)$ in. FIG. 3a ($I=1\ldots5$, $J=1\ldots6$) were calculated on the assumption that the distance $d_U(I,I)$ and $d_U(I,R)$ (where the capital letters in the parentheses indicate OCR output and dictionary characters, respectively) between the upper case alphabetic characters are "0" and "15", respectively; that the intercharacter distances $d_L(l,i)$, $d_L(l,r)$, $d_L(e,r)$, $d_L(e,n)$, $d_L(e,e)$, $d_L(i,n)$, $d_L(i,e)$, $d_L(i,i)$, $d_L(n,e)$, $d_L(n,i)$ and $d_L(n,n)$ (where the small letters in the parentheses indicate the OCR output characters and dictionary characters, respectively) between the lower case alphabetic characters are "0", "15", "15", "15", "0", "15" "15", "0", 15", "15" and "0", respectively; and that the intercharacter distances between the unidentifiable OCR character output "?" and dictionary characters are "15". For example, the intercharacter distance $d(1,1)$ is "0" due to the operation at the step 105 of FIG. 2 which provides MIN$\{d_U(I,I), d_L(l,i)\}$ in this case. The intercharacter distance $d(4,5)$ is $d_L(i,i)$, i.e. "0".

To describe the calculation of the disparities $D(I,J)$ taking for example the disparity $D(3,4)$ which will result from the comparison between the OCR character outputs up to the third character "e" and the dictionary characters up to the fourth, "E", the disparity $D(3,4)$ will be obtained as "30" by the operation $d(3,4) + \text{MIN}\{D(3,3), D(2,3), D(2,4)\}$ at the step of 106 of FIG. 2.

It should be recognized in FIG. 3a that the disparities $D(I,J)$ (where $J<I-1$ or $J>I+1$), which are $D(1,3)$, $D(1,4)$, $D(1,5)$, $D(1,6)$ $D(2,4)$, $D(2,5)$, $D(2,6)$, $D(3,1)$, $D(3,5)$, $D(3,6)$, $D(4,1)$, $D(4,2)$, $D(4,6)$, $D(5,1)$, $D(5,2)$ and $D(5,3)$, are all excluded from the comparison concerned because the width of comparison S has been supposed to be "1" in connection with FIG. 3a. That is, relatively large values will be selected for such exceptional disparities though not shown in the drawing.

The operation described above for calculating disparities is repeated sequentially as indicated by a dotted line in FIG. 3a. The result will be the value "30" which indicates the disparity $D(5,6)$ between the whole OCR character output train and the whole dictionary word.

FIG. 3b depicts the correspondence between the OCR output characters and the dictionary characters. The correspondence shown was determined by the calculated disparities between the OCR character output train and dictionary word indicated in FIG. 3a by way of example. As shown, from the right to the left, the OCR output "I" corresponds to the dictionary character "I", the unidentifiable OCR output to the dictionary characters "R" and "N", the OCR output "e" to the dictionary character "E", the OCR output "i" to the dictionary character "I", and the OCR output "n" to the dictionary character "N".

Figure 4:
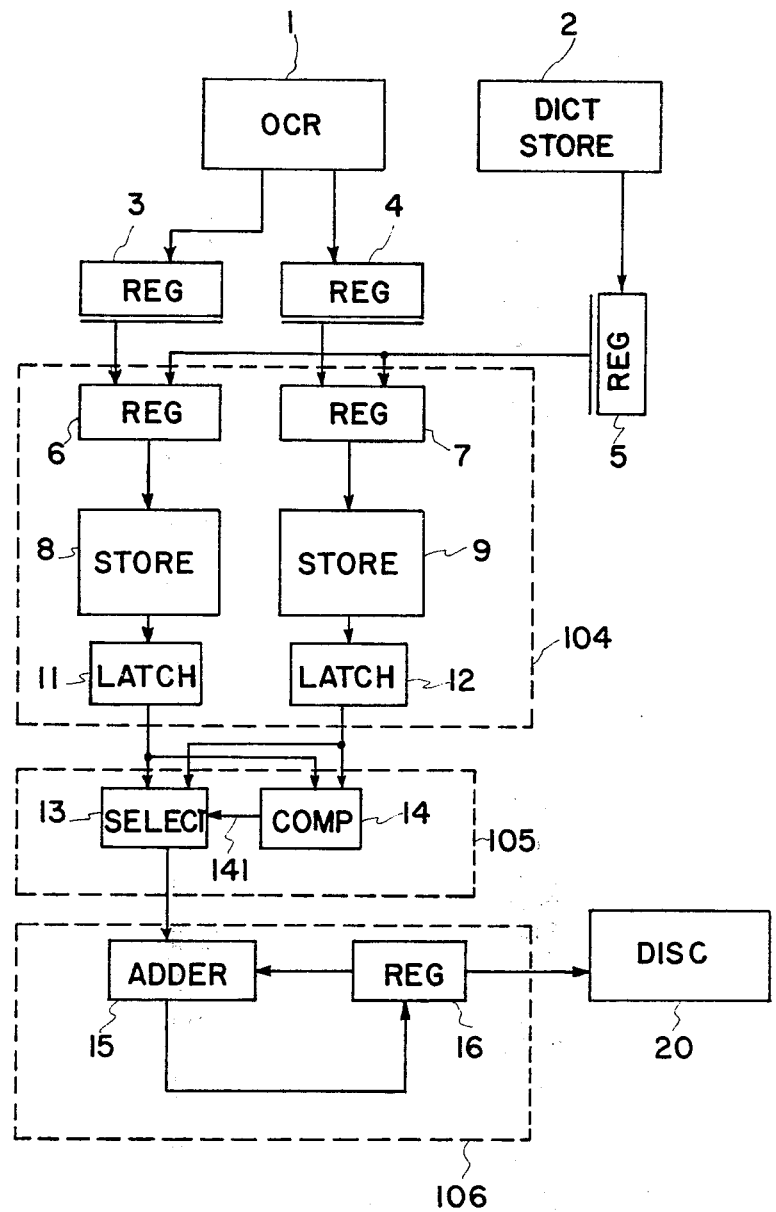
FIG. 4 is a block diagram showing one embodiment of the present invention.

Referring now to FIG. 4, a disparity detection apparatus embodying the present invention is illustrated in a block diagram. For illustrative purpose, this disparity detector is supposed to employ a comparing device which operates with a width of comparison "0". Since thus $S=0$, the comparing input position I and comparing word position J in FIG. 2 remain constantly the same with each other, i.e. $I=J$, making the step 108 of FIG. 2 needless. Moreover, the intercharacter distances $d_U(I,J)$ of the first kind of characters and those $d_L(I,J)$ of the second kind of characters at the step 104 should only be replaced by simple $d_U(I,I)$ and $d_L(I,I)$, respectively. Eventually, the operation at the step 106 can be modified into a far simpler one expressed as $D(I,I) = d(I,I) + D(I-1, I-1)$.

It will be clear to those skilled in this art that the present invention is equally applicable to a comparing device having any other desired width of comparison S.

In FIG. 4, the blocks include an OCR 1 and a dictionary storage 2 storing dictionary words therein. A first register 3 stores alphabetic character outputs of the OCR 1 regarded as upper case sequentially therein in the inputted order. A second register 4 stores OCR alphabetic character outputs regarded as lower case sequentially therein in the inputted order. A word store register 5 stores a dictionary word which will be supplied from the dictionary storage 2 to be compared with an OCR character output train. The registers 3 and 4 are coupled to first and second address registers 6 and 7, respectively, which in turn connect to first and second intercharacter distance storages 8 and 9, respectively. Of these storages 8 and 9, the storage 8 stores such upper case alphabetic intercharacter distances as those shown previously, whereas the storage 9 stores lower case alphabetic intercharacter distances. Latch circuits 11 and 12 are individually associated with the intercharacter distance storages 8 and 9. The outputs of these latches 11 and 12 are individually connected to both a selector 13 and a comparator 14. Further included in the illustrated circuitry are an adder 15, a disparity register 16 and a discriminator 20.

The flowchart of FIG. 2 has correspondence with the block diagram of FIG. 4 as follows. The function at the step 104 in FIG. 2 is alotted to a dotted block 104 of FIG. 4 which is made up of the address registers 6 and 7, upper case and lower case intercharacter distance storages 8 and 9, and latches 11 and 12, the function at the step 105 to a dotted block 105 consisting of the selector 13 and comparator 14; and the function at the step 106 to a dotted block 106 consisting of the adder 15 and disparity register 16.

The circuitry having the above construction will be operated in the manner described hereinafter.

For one character field, the OCR 1 supplies the first register 3 with a character output train regarded as upper case alphabetic characters and the second register 4 with a character output train regarded as lower case alphabetic characters. In the meantime, the dictionary storage 2 is transferring words for comparison sequentially to the word store register 5, which in this case have the same number of characters as that of the OCR output train because S is selected to be zero. The address register 6 sequentially addresses those elements of the upper case intercharacter distance storage 8 which are determined by the OCR character outputs in the first register 3 and the corresponding dictionary characters in the word register 5. The outputs of the storage 8 are transferred into the latch 11 in sequence. Imagine an instant, for example, when the OCR character output in the first register 3 is the upper case alphabetic character "O" (15th character along the columns in FIG. 1) while the dictionary character in the word store register 5 is the upper case alphabetic character "D" (4th character along the rows in FIG. 1). Then the address register 6 will address the element $d_{15,4}(O,D)$ in the upper case intercharacter distance storage 8 where the 4th row and the 15th column meet each other, thereby supplying the latch 11 with the value "8".

Like the address register 6, the address register 7 sequentially addresses selected elements of the lower case intercharacter storage 9 which are depended on the OCR character outputs in the second register 4 and the corresponding dictionary characters in the word store register 5. The outputs of this storage 9 are coupled sequentially to the latch 12.

The latches 11 and 12 latch values of the updated upper case intercharacter distance and the lower case intercharacter distance outputted thereto from the associated storages 8 and 9 in response to the address registers 6 and 7. The output of each latch 11 and 12 is applied to both the comparator 14 and selector 13. The comparator 14 compares the intercharacter distance outputs delivered from respectively the latches 11 and 12 and, if the former is smaller than the latter, sets its output 141 to logical "1" but, if not, resets the output 141 to logical "0".

Upon a change of the comparator output 141 to logical "1" the selector 13 passes the content of the latch 11, i.e. upper case intercharacter distance which has a smaller value in that case, to the adder 15. However, upon a change of the comparator output 141 to logical "0", the selector 13 couples the content of the other latch 12, i.e. lower case intercharacter distance, to the adder 15. The adder 15 processes the output of the selector 13 and the content of the disparity register 16 to supply the summation output thereof to the disparity register 16. The disparity register 16 is initially reset to "0" but, at the instant intercharacter distance determined by the Ith character of the OCR character output train and the Ith character of the dictionary word, it will have stored a disparity obtained as a result of comparison between the OCR character outputs and dictionary characters up to the $(i-1)$th. After the contents of the first and second registers 3, 4 have all been compared, the resultant disparity between the OCR character output train and the dictionary word is delivered from the disparity register 16 to the discriminator 20. Then the discriminator 20 processes disparities, which were provided by the repeated procedure previously discussed, between the OCR character output train and a plurality of dictionary words. If the smallest disparity $D_1$ and the second smallest disparity $D_2$ of all the disparities satisfy the relations $D_1 \leq T_1$ and $D_2 - D_1 > T_2$ where $T_1$ and $T_2$ are given threshold values, the discriminator 20 will recognize the specific word with the disparity $D_1$ as a word which corresponds to the OCR's input character field.

The embodiment of the present invention has been shown and described as processing two series of alphabetic characters which are upper case and lower case, respectively. However, it will be apparent to those of skill that the present invention is also practicible even when the two character trains are of the same kind of case. In such a case, two candidate alphabetic characters of the same kind such as "i" and "1" will be picked up out of all the OCR outputs corresponding to respective characters, whereupon a smaller one of intercharacter distances will be adopted to obtain the eventual disparity for word recognition.

In summary, it will be seen that the present invention provides a highly accurate and simple word recognition apparatus which can detect the disparity between an OCR character output train and a dictionary word even if a discrimination between upper and lower case alphabetic characters appears difficult or even if upper case and lower case alphabetic characters are mixed up in a word.

Various modifications will become possible for those skilled in the art after receiving the teachings of the present disclosure without departing from the scope thereof.

What is claimed is:

1. A word recognition apparatus comprising:

a character reader outputting a first train of characters $\alpha_1, \alpha_2, \ldots \alpha_n$ regarded as characters of a first kind and a second train of characters $\beta_1, \beta_2, \ldots \beta_n$ regarded as characters of second kind in response to one character field, a first register for storing said first train of characters $\alpha_1, \alpha_2 \ldots \alpha_n$ delivered thereto from said character reader in the order of delivery, a second register for storing said second train of characters $\beta_1, \beta_2, \ldots \beta_n$ delivered thereto from said character reader in the order of delivery, a first storage device for storing a first kind intercharacter distance $d\{\alpha, U(i)\}$ between the ith character category $U(i)$ of the first kind of characters and a character $\alpha$ outputted from said character reader regarded as the first kind of character, a second storage device for storing a second kind intercharacter distance $d\{\beta, L(i)\}$ between the ith character category $L(i)$ of the second kind of characters and a character $\beta$ outputted from said character reader regarded as the second kind of character, a third storage device for storing a dictionary word to be compared with the output character train of said character reader, intercharacter distance reading means for reading out of said first storage device as the first kind intercharacter distance the distance $d\{\alpha_k, a_j\}$ which is determined by the jth character $a_j$ of said dictionary word and the content $\alpha_k$ of the kth elements (where $J-s \leq k \leq j+s$ and s is preselected constant 0, 1, 2, ...) of said first register to be compared with the jth character $a_j$ of said dictionary word and out of said second storage device as the second kind intercharacter distance the distance $d\{\beta_k, a_j\}$ which is determined by said jth character $a_j$ of said dictionary word and the content $\beta_k$ of the kth element of said second register to be compared therewith, intercharacter distance comparing means for comparing the read-out intercharacter distances $d\{\alpha_k, a_j\}$ and $d\{\beta_k, a_j\}$ to select a smaller one as a representative intercharacter distance between the character $a_j$ of the dictionary word and the kth output characters $\alpha_k$ and $\beta_k$, and means for calculating the disparity between the dictionary word and the character output trains by use of the representative character distances selected by said comparing means.

* * * * *